(12) United States Patent
Khalaj Amineh et al.

(10) Patent No.: US 11,655,702 B2
(45) Date of Patent: May 23, 2023

(54) SPACE MAPPING OPTIMIZATION TO CHARACTERIZE MULTIPLE CONCENTRIC PIPES

(71) Applicant: Halliburton Energy Services, Inc., Houston, TX (US)

(72) Inventors: Reza Khalaj Amineh, Houston, TX (US); Burkay Donderici, Pittsford, NY (US); Luis Emilio San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 800 days.

(21) Appl. No.: 16/066,276

(22) PCT Filed: Mar. 2, 2016

(86) PCT No.: PCT/US2016/020378
§ 371 (c)(1),
(2) Date: Jun. 26, 2018

(87) PCT Pub. No.: WO2017/151123
PCT Pub. Date: Sep. 8, 2017

(65) Prior Publication Data
US 2020/0284137 A1 Sep. 10, 2020

(51) Int. Cl.
*E21B 47/00* (2012.01)
*G01B 7/06* (2006.01)
(Continued)

(52) U.S. Cl.
CPC ............... *E21B 47/00* (2013.01); *G01B 7/10* (2013.01); *G01V 3/38* (2013.01); *E21B 47/12* (2013.01); *E21B 47/26* (2020.05)

(58) Field of Classification Search
CPC .......... E21B 47/00; E21B 47/26; E21B 47/12; E21B 47/085; G01B 7/10; G01V 3/38; G01V 3/28
See application file for complete search history.

(56) References Cited

U.S. PATENT DOCUMENTS

| 2006/0260391 A1 | 11/2006 | Harthorn et al. |
| 2008/0228680 A1 | 9/2008 | Chen et al. |

(Continued)

FOREIGN PATENT DOCUMENTS

| EP | 0112248 B1 | 2/1987 | |
| WO | WO-2015061487 A2 * | 4/2015 | ......... G01N 27/9073 |

OTHER PUBLICATIONS

Bandler, John W., "Implicit Space Mapping Optimization Exploiting Preassigned Parameters", 2004, IEEE Transactions on Microwave Theory and Techniques, vol. 52, No. 1, pp. 378-385 (Year: 2004).*

(Continued)

*Primary Examiner* — Yoshihisa Ishizuka
*Assistant Examiner* — Yossef Korang-Beheshti
(74) *Attorney, Agent, or Firm* — Delizio, Peacock, Lewin & Guerra

(57) ABSTRACT

Apparatus and methods can be implemented to monitor the condition of the production and intermediate casing strings in oil and gas field operations. A series of measurements can be made in a multi-pipe structure and received responses can be operated on by employing a mapping optimization procedure in which a surrogate model is updated. Estimates of one or more properties of the pipes of the multi-pipe structure can be generated using coefficients of the updated surrogate model. Additional apparatus, systems, and methods are disclosed.

13 Claims, 9 Drawing Sheets

(51) Int. Cl.
*G01V 3/38* (2006.01)
*E21B 47/26* (2012.01)
*E21B 47/12* (2012.01)

(56) References Cited

U.S. PATENT DOCUMENTS

| | | | |
|---|---|---|---|
| 2009/0188665 A1 | 7/2009 | Tubel et al. | |
| 2009/0195244 A1 | 8/2009 | Mouget et al. | |
| 2014/0191762 A1* | 7/2014 | Chen | G01V 3/24 324/355 |
| 2015/0226049 A1 | 8/2015 | Francos et al. | |
| 2016/0327675 A1* | 11/2016 | Donderici | E21B 47/002 |
| 2017/0176629 A1* | 6/2017 | Omeragic | G01V 3/28 |

OTHER PUBLICATIONS

Arbuzov, et al., "Memory Magnetic Imaging Defectoscopy", Society of Petroleum Engineers, SPE Russian Oil & Gas Exploration & Production Technical Conference and Exhibition, Russia, 2012, 10 pages.

Bandler, et al., "Implicit Space Mapping Optimization Exploiting Preassigned Parameters", IEEE Transactions on Microwave Theory and Techniques, vol. 52 No.1, Jan. 2004, pp. 378-385.

Bandler, et al., "Space Mapping: the State of the Art", IEEE Transactions on Microwave Theory & Techniques, vol. 52 No 1, Jan. 2004, pp. 337-361.

Dodd, et al., "Induction Coils Coaxial With an Arbitrary Number of Cylindrical Conductors", Journal of Applied Physics, vol. 45 No. 2, Feb. 1974, pp. 638-647.

Garcia, et al., "Successful Application of a New Electromagnetic Corrosion Tool for Well Integrity Evaluation in Old Wells Completed With Reduced Diameter Tubular", International Petroleum Technology Conference, IPTC 16997, Mar. 2013, China, 13 pages.

Haugland, "Fundamental Analysis of the Remote-Field Eddy-Current Effect", IEEE, Transactions on Magnetics, vol. 32 No. 4, Jul. 1996, pp. 3195-3211.

Koziel, et al., "Towards a Rigorous Formulation of the Space Mapping Technique for Engineering Design", International Symposium on Circuits and Systems (ISCAS), Japan 2005, pp. 5605-5608.

International Application No. PCT/US2016/020378, International Search Report dated Nov. 29, 2016, 6 pages.

International Application No. PCT/US2016/020378, Written Opinion dated Nov. 29, 2016, 6 pages.

* cited by examiner

SPACE MAPPING OPTIMIZATION TO CHARACTERIZE MULTIPLE CONCENTRIC PIPES

TECHNICAL FIELD

The present invention relates generally to apparatus and methods with respect to measurements related to oil and gas exploration.

BACKGROUND

Monitoring the condition of production and intermediate casing strings is crucial in oil and gas field operations. Electromagnetic (EM) techniques are common in inspection of these components. EM sensing provides continuous, in situ measurements of the integrity of tubing/casing. As a result, there has been considerable interest in using EM techniques in cased borehole monitoring applications. One major EM technique operates based on producing and sensing eddy currents (EC) in these components, which are metallic. In the EC technique, a transmitting coil emits a primary field into the pipes. These fields produce eddy currents in the pipes. These currents, in turn, produce secondary fields.

Characterization of the pipes is typically performed by measuring and processing these secondary fields. In current inversion algorithms to characterize the pipes based on the measured responses, either a library or a forward model is required to estimate the parameters of the pipes such as electrical properties and dimensions of defects. While extensive amount of work is required to produce a complete library, forward models also suffer some intrinsic drawbacks. The forward models can be categorized into two groups: (1) analytical models and (2) numerical models. Analytical models are fast but less accurate than numerical models. However, numerical models are expensive in terms of the required amount of memory and time to obtain the solution.

Further, the available tools do not employ complicated inversion procedures for evaluation of multiple pipes. They rely on simple interpretations of either the frequency-domain response or the time-domain decay response. One current corrosion inspection tool provides estimates of the total thickness of the casings employing multiple frequency-domain data acquisitions and interpretations. Azimuthal resolution is achieved via the use of multiple receivers distributed along the azimuthal direction. Other corrosion inspection tools analyze the time-domain decay response to characterize the tubing plus casing with azimuthally symmetrical transmitters and receivers. The usefulness of such processed measurements may be related to the precision or quality of the data derived from such measurements.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, a processing technique can be implemented that combines analytical and numerical forward models to obtain fast and accurate characterization results for multiple concentric pipes. The multiple concentric pipes may be a set of pipes that are presumed or initially arranged to be concentric. Such techniques can provide for pipe characterization that can be performed faster than using the numerical forward models; for pipe characterization that can be performed with more accuracy than using the analytical forward models; and for characterization of the multiple pipes with better accuracy and higher speed that provides a more precise evaluation of these components and ultimately leads to a significant positive impact on the production process.

Figure 1:
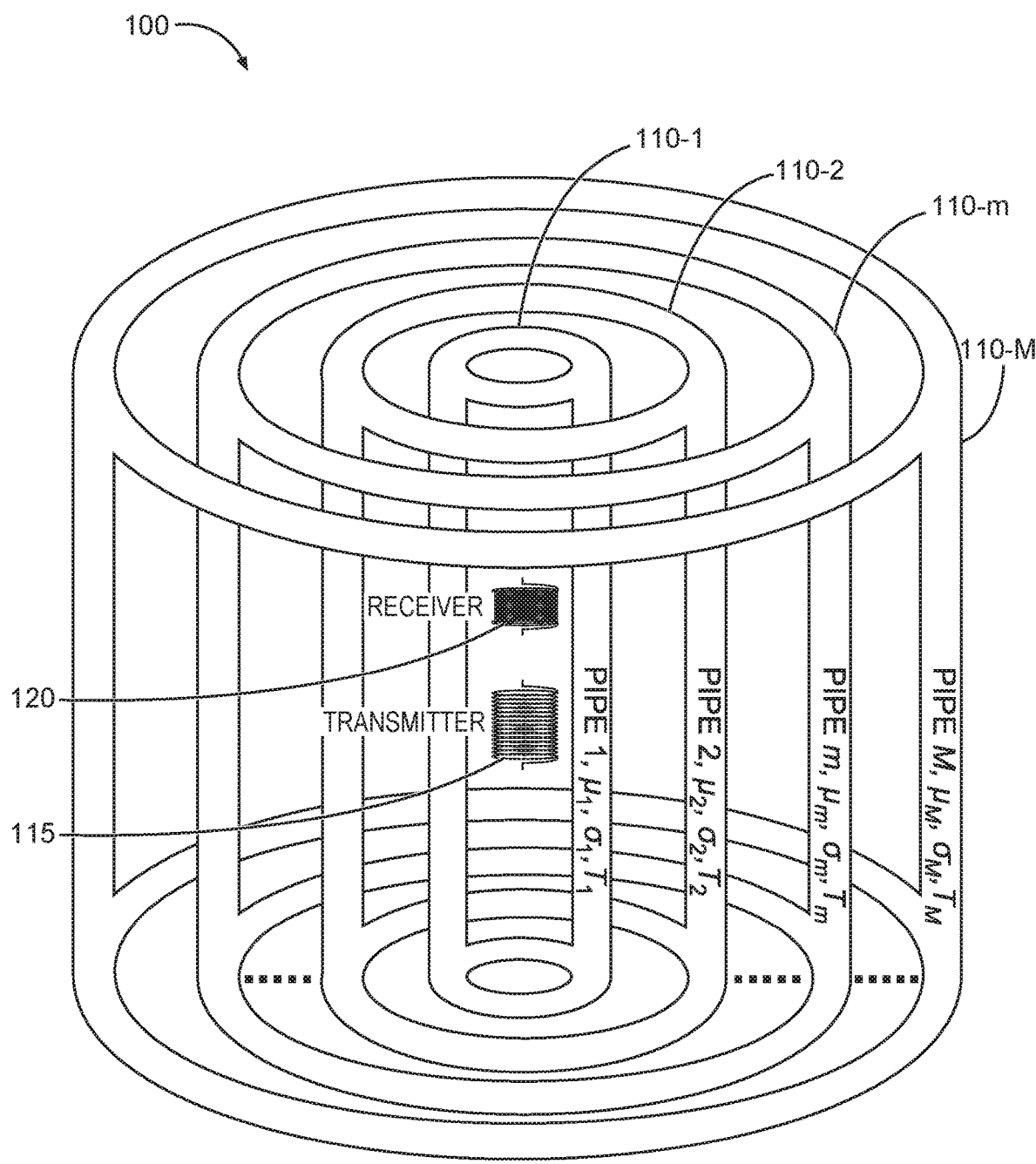
FIG. 1 is a schematic representation of a concentric pipe configuration, in accordance with various embodiments.

FIG. 1 is a schematic representation of a concentric pipe configuration 100. The concentric pipe configuration 100 can include a number of pipes, 110-1, 110-2 . . . 110-$m$, 110-M. With respect to properties of pipes 110-1, 110-2 . . . 110-$m$ . . . 110-M, thicknesses of each of the pipes are denoted by $T_1$, $T_2$, . . . $T_m$ . . . to $T_M$, the relative permeabilities of the pipes are denoted by $\mu_1$, $\mu_2$, . . . $\mu_m$ . . . to $\mu_M$, and the conductivities of the pipes are denoted by $\sigma_1$, $\sigma_2$, . . . $\sigma_m$ . . . to $\sigma_M$. A transmitter 115 can be arranged with respect to a receiver 120 in the concentric pipe configuration 100. Data generated by the operation of the transmitter 115 and receiver 120 can be processed using a combined technique, as taught herein, to monitor the status of the individual pipes of the concentric pipe configuration 100. The transmitter 115 and the receiver 120 can be arranged to be movable in parallel with an axis of the concentric pipe configuration 100. Wireline arrangements, or other conventional conveyance techniques, can be used to dispose the transmitter 115 and the receiver 120 in the concentric pipe configuration 100 below the earth's surface at a well site. Alternatively, the transmitter 115 and the receiver 120 may be realized as a number of transmitters and receivers within the concentric pipe configuration 100 disposed at different depths from the earth's surface.

Figure 2:
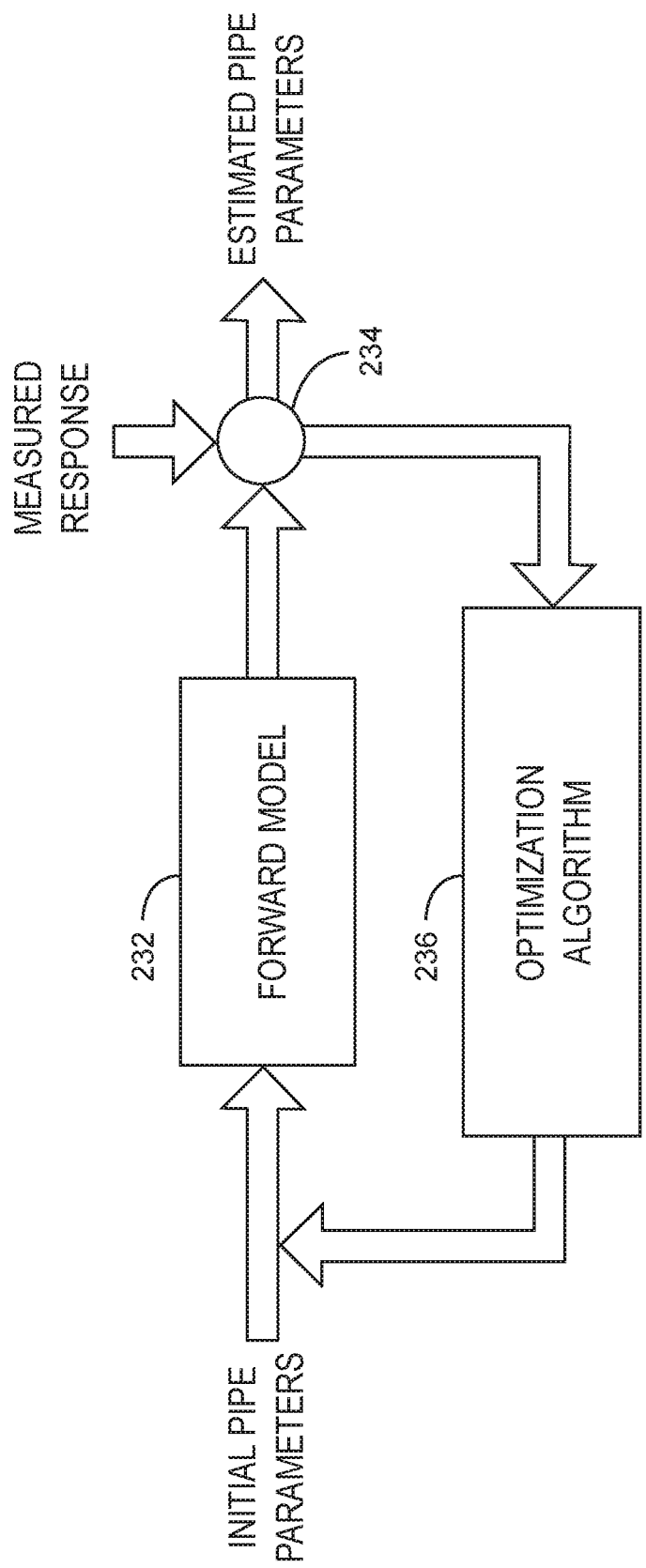
FIG. 2 is a block diagram of a pipes characterization process, in accordance with various embodiments.

FIG. 2 is a block diagram of a pipes characterization process. Initial parameters of the pipes being characterized can be input to a forward model 232. These parameters can be input on an individual basis with respect to each pipe. The forward model 232 may be a numerical forward model or an analytic forward model. In lieu of a numerical forward model, a library or a library in combination with a numerical forward model may be implemented. Output from the forward model 232 can be input to a comparator 234 to which a measured response is input. If the comparison of the output of the forward model 232 and the measured response is less than a threshold for a particular parameter of a set of parameters, output of the comparator 234 can be estimated parameters of the pipes. The estimated parameters may be output on an individual basis with respect to each pipe. If the comparison of the output of the forward model 232 and the measured response is less than a threshold, output of the comparator 234 can be provided to a optimization algorithm 236, where the output of the optimization algorithm 236 can be provided as new input to the forward model 232 to reiterate the process. The optimization algorithm 236 play include a comparison algorithm to further operate on the output of the forward model 232, the measured responses, and/or the comparison of the of the forward model 232, the measured responses.

In various embodiments, space mapping (SM) optimization technology is implemented to characterize multiple pipes. By using this technique, the optimization burden can he shifted from an expensive "fine" (or high-fidelity) model to a cheap "coarse" (or low-fidelity) model by iteratively optimizing and updating a surrogate model. In an embodiment, the fine model can be a numerical forward model, which can be based on, for example, a finite element method or a finite difference time domain method. The coarse model can be an analytical forward model developed to model the setup as close as possible using theoretical expressions.

Figure 3:
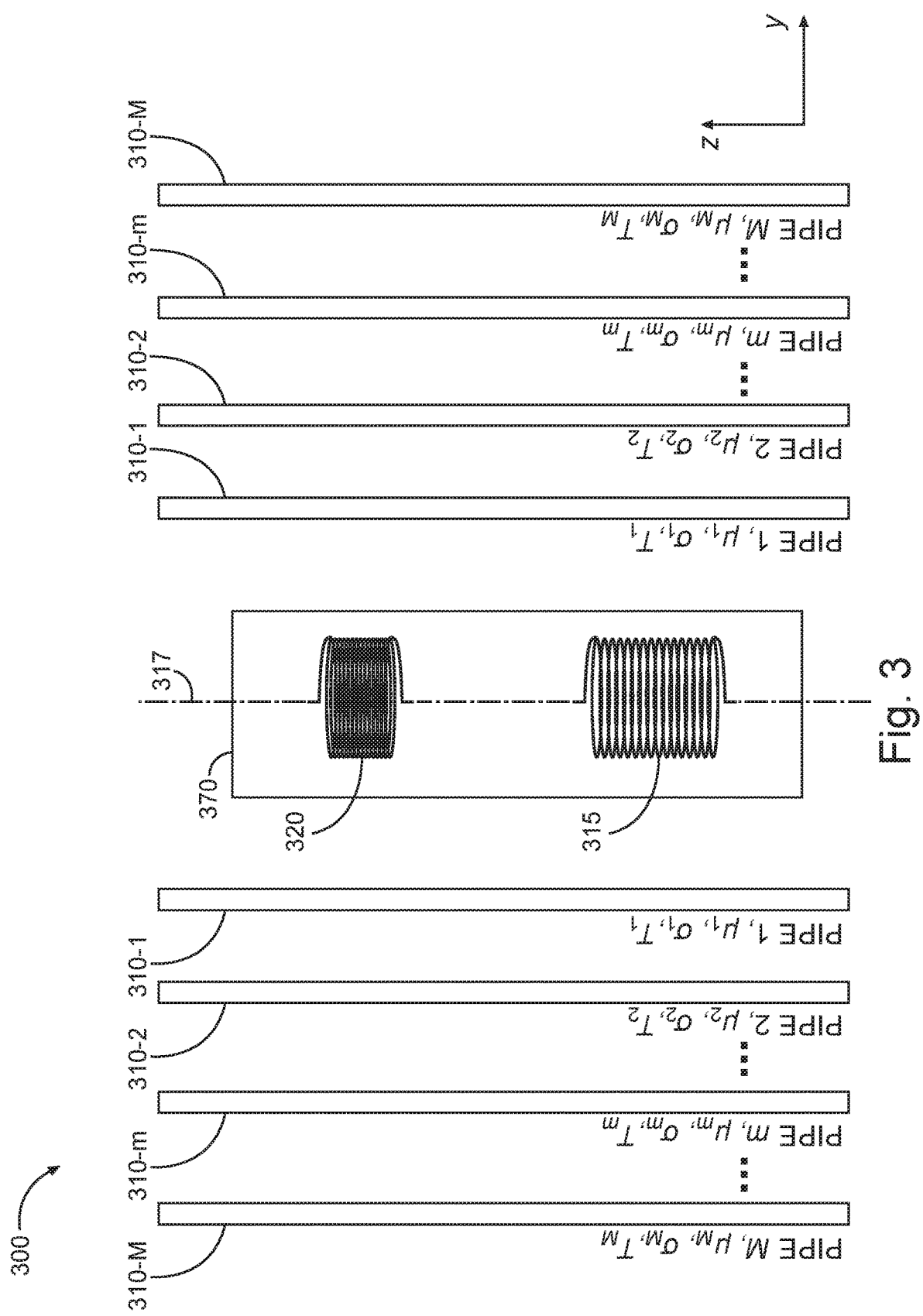
FIG. 3 is a schematic of a cross-section of a concentric pipe configuration for inspection to which a space mapping can be applied, in accordance with various embodiments.

FIG. 3 is a schematic of a cross-section of a concentric pipe configuration 300 for inspection to which a space mapping can be applied. The concentric pipe configuration 300 can include a number of pipes, 310-1, 310-2, . . . 310-$m$ . . . 310-M having a symmetry axis 317. With respect to properties of pipes 310-1, 310-2, . . . 310-$m$ . . . 110-M, thicknesses of each of the pipes are denoted by the relative permeabilities of the pipes are denoted by $T_1, T_2, \ldots T_m \ldots$ to $T_M$, the relative permeabilities of the pipes are denoted by $\mu_1, \mu_2, \ldots \mu_m, \ldots$ to $\mu_M$, and the conductivities of the pipes are denoted by $\sigma_1, \sigma_2, \ldots \sigma_m \ldots$ to $\sigma_M$. A tool 370 can be disposed in the concentric pipe configuration 300. The tool 370 can include a transmitter 315 and a receiver 320 in the concentric pipe configuration 300. Data generated by the operation of the transmitter 315 and receiver 320 can be processed using a space mapping technique, as taught herein, to monitor the status of the individual pipes of the concentric pipe configuration 300. The tool 370 can be arranged to be movable. Motion of the tool 370 may be in parallel with the symmetry axis 371 of the concentric pipe configuration 300. Wireline arrangements, or other conventional conveyance techniques, can be used to dispose the transmitter 315 and the receiver 320 in the concentric pipe configuration 300 below the earth's surface at a well site. Alternatively, the transmitter 315 and the receiver 320 may be realized as a number of transmitters and receivers within the concentric pipe configuration 300 disposed at different depths from the earth's surface.

Figure 4A:
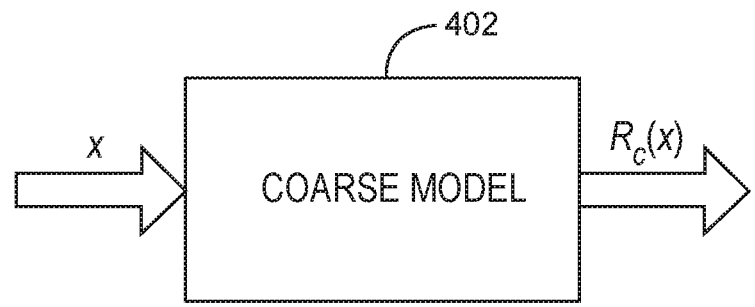
FIG. 4A is a general representation of a coarse model, in accordance with various embodiments.
Figure 4B:
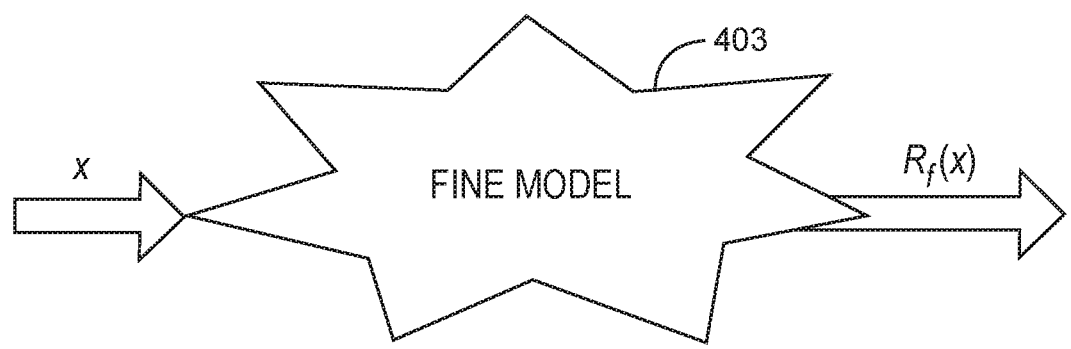
FIG. 4B is a general representation of a fine model, in accordance with various embodiments.

In accordance with the discussions above, it is assumed that the concentric pipe configuration 300 may be modeled in two different ways: (1) by an accurate but expensive to compute model called "fine" model and (2) by a fast but less accurate model called "coarse" model. FIG. 4A is a general representation of a coarse model 402. As noted above, the coarse model can be fast but less accurate. Input to the coarse model 402 is a vector of unknown parameters, x, where an output of the coarse model 402 is a vector of responses $R_c(x)$ that is a function of the input vector x. FIG. 4B is a general representation of a fine model 403. As noted, the fine model can be more accurate but slow. Input to the fine model 403 is a vector of unknown parameters, x, where an output of the fine model 402 is a vector of responses $R_f(x)$ that is a function of the input vector x.

Generally, the purpose of an optimization problem is to solve $$x^*_f = \arg\min_x U(R_f(x)) \tag{1}$$

where x is the vector of unknown parameters, $x^*_f$ is the optimal solution to be determined, and $R_f$ is the vector of responses. The subscript f indicates the fine model and U is a suitable objective function. SM aims at establishing a mapping between the fine model and a coarse/surrogate model by matching their responses. The time-expensive optimization solving equation (1) directly is avoided and replaced by iterative optimization and update of the fast coarse/surrogate model. Therefore, a good estimate $x_f$ of $x^*_f$ can be declared through the mapping.

Figure 5:
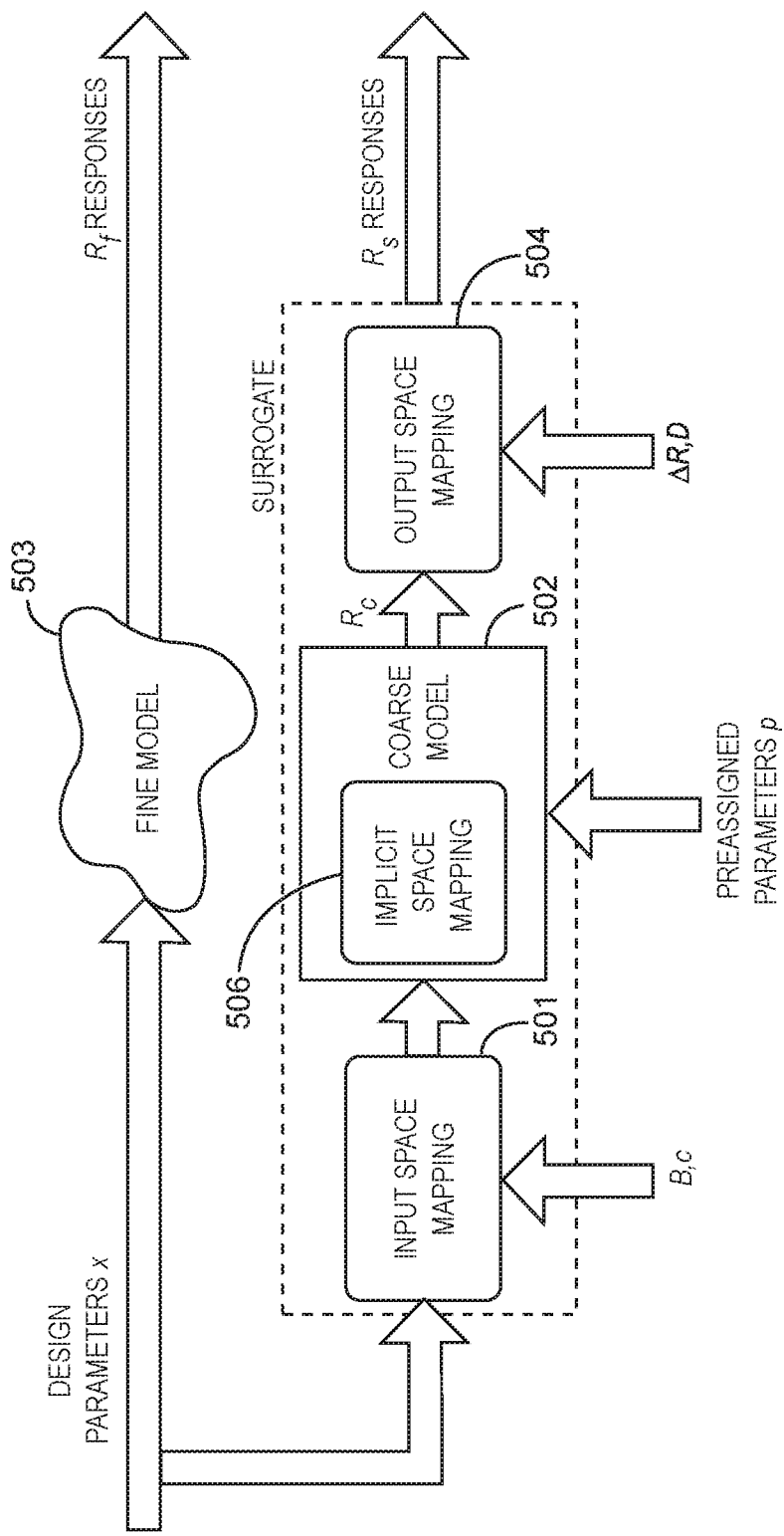
FIG. 5 is an illustration of input, implicit, and output space mapping, in accordance with various embodiments.

In a surrogate-based SM, the coarse model s properly calibrated to become a so-called surrogate model after it is matched to the fine model. This process uses, for example, implicit [1], output [2], and/or input SM. FIG. 5 illustrates input, implicit, and output space mapping. Input SM corresponds to the original SM, see as discussed, for example, in J. V. Bandier et al, "Space mapping: The state of the art," *IEEE Transactions on Microwave Theory and Techniques*, vol. 52, no. 1, pp. 337-361, January 2004. An example of implicit SM is presented in J. W. Bandler et al, "implicit space mapping optimization exploiting preassigned parameters," *IEEE Transactions on Microwave Theory and Techniques*, vol. 52, no. 1, pp. 378-385, January 2004. An example of output SM is presented in S. Koziel et al, "Towards a rigorous formulation of the space mapping techniques for engineering design," in *Proc. ISCAS*, Kobe, Japan, June 2005, pp. 5605-5608.

At the ith iteration, the general surrogate model can be defined as $$R_S^{(i)}(x) = D \cdot R_c(B^{(i)}x + c^{(i)}, p^{(i)}) + \Delta R^{(i)}, \tag{2}$$

where p is a vector of preassigned parameters, which are not elements of x; B and c is a matrix and vector of a linear mapping or any other mappings; and $\Delta R$ is a response difference vector defined as below:

$$\Delta R^{(i)} = \begin{cases} D^{-1} R_f(x_f^{(i-1)}) - R_c(B^{(i-1)} x_f^{(i-1)} + \\ c^{(i-1)}, p^{(i-1)}), i \geq K, 0 \leq i < K \\ 0 \end{cases} \tag{3}$$

where K is a positive integer. It is noted here that a polynomial model consisting of higher number of parameters than Bx+c could also be used in the mapping process leading to higher accuracy. For example, $Ax^2+Bx+c$ is a polynomial model having a higher number of parameters than Bx+c. An alternative model is an exponential model Aexp(Bx)+c, where exp is the exponential function.

The implicit, output, and input SM build or enhance the mapping at different levels. The implicit SM 506 aligns a coarse model 502 and a fine models 503 by tuning the pre-assigned parameters p. The initial values $p^{(0)}$ are usually assigned to be the same as those in the fine model 503. The output SM 504 works directly at the response level using the vector $\Delta R^{(i)}$ and matrix D.

The input SM 501 operates directly on the design parameters by tuning B and/or c, for example according to equation (2). The matrix $B^{(0)}$ can be initialized as the identity matrix and the vector $c^{(0)}$ can be initialized as a zero vector. In general, the matrix B, and the vectors c and p can be updated together at the ith iteration (i>0) by solving $$(B^{(i)}, c^{(i)}, p^{(i)}, \Delta R^{(i)}, D^{(i)}) = \arg\min_{B,c,p,\Delta R, D} \varepsilon^{(i)}(B,c,p,\Delta R, D) \quad (4)$$

where $\varepsilon^{(i)}$ is the matching condition at the ith iteration that is calculated by $$\varepsilon^{(i)}(B,c,p,\Delta R,D) = \|R_f(x_f^{(i-1)}) - R_S^{(i-1)}(x_f^{(i-1)})\| \quad (5)$$

where $$R_S^{(i-1)}(x_f^{(i-1)}) = DR_C(Bx_f^{(i-1)} + c, p) + \Delta R^{(i-1)} \quad (6)$$

This step is called the parameter extraction process. Here, $\| \ \|$ is a suitable norm. A sequence of points $x_f^{(i)}$, i=0, 1, 2, . . . can be subsequently generated by solving $$x_f^{(i)} = \arg\min_x U(R_S^{(i)}(x)). \quad (7)$$

Equation (4) indicates the parameter extraction, which is itself an optimization procedure. The procedure can be executed efficiently because the evaluation of the surrogate model $R_x^{(i)}(x)$ is usually fast. In some cases, the matrix B is fixed as the identity matrix and/or c is fixed as 0. When the implicit SM is not applied, the vector p is fixed at its initial values.

The termination criteria of SM include one or more of convergence being achieved or the maximum iteration number being reached. For example, convergence can be achieved when the change in objective function value is small.

In various embodiments, multiple pipe characterization can be implemented using SM optimization technology. In multiple pipe characterization, typically the thicknesses of the pipes $T_1$ to $T_M$ are parameters of interest x assuming that the electrical properties of the pipes are known. Here, the coarse model can be the analytical solutions using known analytical solution approaches for multiple concentric pipe configurations. See, for example, C. V. Dodd et al., Induction coils coaxial with an arbitrary number of cylindrical conductors, "J. of applied Physics, Vol. 45, No. 2, February 1974 and S. M. Haugland, Fundamental analysis of the remote-field. eddy-current effect," IEEE Transactions on Magnetics, Vol. 32, No. 4, July 1996. These approaches provide approximate, but fast solutions for the inspection of multiple pipes with transmitter and receiver in the form of current loops. They are one-dimensional models meaning that only the variation of the model along the radial direction is allowed while the pipe configuration is assumed to be symmetrical along the axial and azimuthal directions.

However, in practice, the transmitter and receiver can be large coils that usually include highly magnetic materials such as ferrite as their core. These details typically cannot be modeled exactly employing the analytical approaches and this leads to approximate solutions in the modeling of the measurement setup. On the other hand, all these details can be modeled exactly with the numerical models. In the frequency domain EC, techniques such as finite element method (FEM) can be employed to solve the problem, while in the time domain EC, techniques such as finite difference time domain (FDTD) can be employed. Alternatively, in the time domain EC, first a frequency domain numerical method such as FEM can be employed to provide solutions in a wide frequency spectrum and then proper frequency-to-time domain conversion algorithms can be employed to obtain time-domain EC responses.

In order to implement SM optimization, the objective function in equation (6) can be constructed as the difference between the vector of the measured responses y and the surrogate model in ith iteration as $$U(R_S^{(i)}(x)) = \|R_S^{(i)}(x) - y\| \quad (8)$$

The preassigned parameters can be, for example, the relative permittivity of the core material, the current in the transmitter coil, the electrical properties of the pipes, etc, in case implicit SM is being applied.

Thus, by using one or more of input, output, or implicit SM optimization, an accurate mapping can be established between the fine model space and the surrogate model space. This results in a significant speed-up over direct gradient-based optimization of the fine model and enhances the accuracy compared to the optimization of the coarse model alone.

Figure 6:
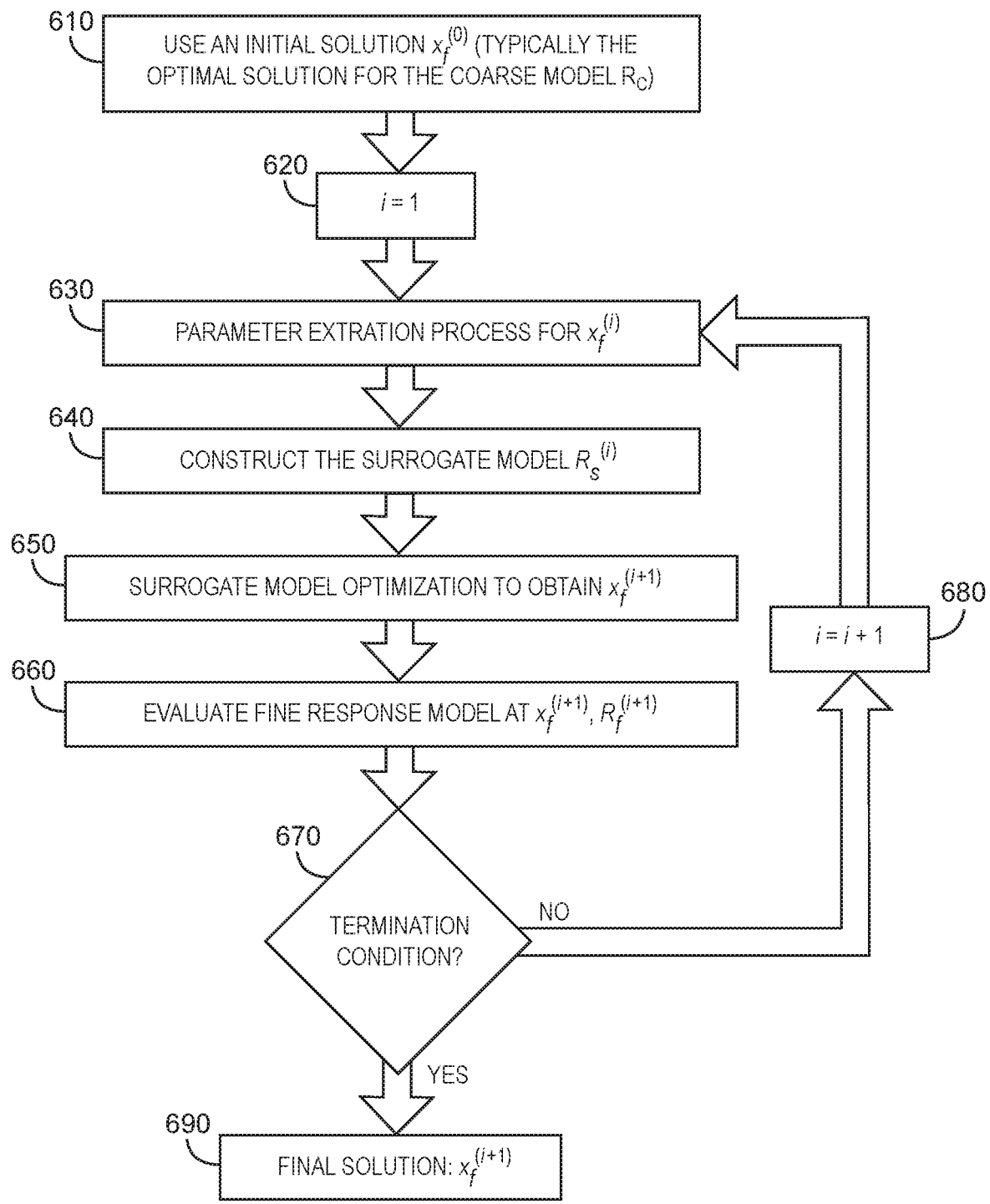
FIG. 6 is a flow diagram of a space mapping optimization algorithm, in accordance with various embodiments.

FIG. 6 is a flow diagram of a SM optimization algorithm. At 610, an initial solution $x_f^{(0)}$ is used. Typically, the optimal solution from the coarse model $R_c$ can be used. At 620, a iteration process can be started by setting an iteration i equal to 1. At 630, a parameter extract process is executed for $x_f^{(i)}$. At 640, a surrogate model $R_s^{(i)}$ can be constructed. At 650, the surrogate model is optimized to obtain $x_f^{(i+1)}$. At 660, a fine model response at $x_f^{(i+1)}$ and $R_f^{(i+1)}$ is evaluated. At 670, a determination is made as to whether a termination condition is reached. If the termination condition has not been attained, the iteration index is increased by 1 at 680 and the processing proceeds to 630 to execute the extraction process for the new index i. If the termination condition has not been attained, the final solution is set to $x_f^{(i+1)}$ at 690.

As mentioned above, the electrical properties of the pipes should be estimated first in order to establish the fine and coarse models for the configuration under test. This can be accomplished by applying SM optimization for sections of the pipe that have nominal thickness values. This time, the thickness of the pipes $T_1$ to $T_M$ are considered to be known and the optimization problem is solved to find the electrical properties such as relative permeabilities $\mu_1$ to $\mu_M$ and conductivities $\sigma_1$ to $\sigma_M$. These estimated electrical properties of the pipes can then be employed to estimate the thicknesses of the pipes at defected sections using an SM optimization process. In this case, the workflow can be conducted as follows:

1) Make a series of measurements at multiple depths.
2) Find the corresponding nominal pipe thicknesses at the multiple depths.
3) Find sections where there is corrosion and there is no corrosion. This can be accomplished using standard deviation, manually, etc.
4) Use the fine model (or both fine and coarse models employing SM optimization algorithm) to solve for pipe magnetic permeability and/or conductivity (p) in the no corrosion sections.
5) Solve for the B, c, D and AR in the same or different no corrosion section using the p calculated in the last step.
6) Use B, c, D, AR, and p to solve for corroded pipe thicknesses $x_f$ in a section where there is corrosion.

After the surrogate model is calculated, a more efficient approximate model can be used to calculate the pipe properties. In this case, instead of using the fine model to calculate the pipe magnetic permeability and conductivity, the surrogate model itself can be used. The fine model can be re-applied when the solution drifts sufficiently away from the initial point last fine model is calculated.

Depending on the particular choices for the coarse and fine models, they may have different resolutions. As a result, the linear mapping per depth described above may not be accurate enough. In order to match the resolution of the surrogate model, a filter F can be added. In this case, a filtered version of $R_s$ is produced instead: $R^*_s = F(R_s)$. This filter can be a deconvolution filter to match resolutions and it can be optimized to match the fine and course responses optimally in cases where thickness is changing. In this case, the workflow can be modified to include another step 5b:

5b) Optimize for filter coefficients of F to match fine and coarse model responses in the same or different no corrosion section using the B, c, D, ΔR and p, which were calculated in last two steps.

An alternative to the above method, based on filtering to match resolution, can include procedures to adjust the transmitter and receiver position or lengths in the coarse model to perform the resolution matching. A step similar to 5b) above can be performed, but this time on the transmitter/receiver position or length instead of filter coefficients.

Figure 7:
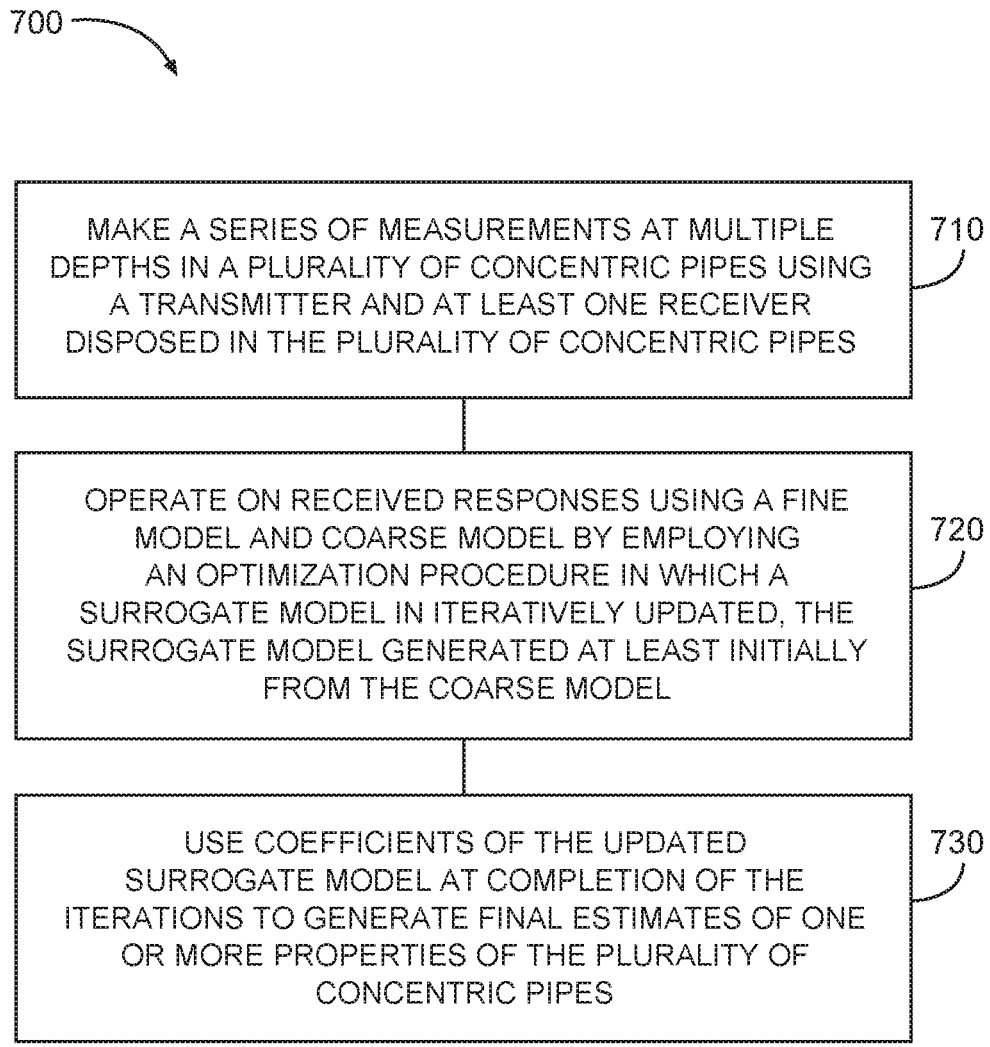
FIG. 7 is a flow diagram of features of an example method of characterizing multiple concentric pipes, in accordance with various embodiments.

FIG. 7 is a flow diagram of features of an embodiment of an example method 700 of characterizing multiple concentric pipes. At 710, a series of measurements at multiple depths in a plurality of concentric pipes is made using a transmitter and at least one receiver disposed in the plurality of concentric pipes. The measurements can be conducted by generating a set of probe signals from the transmitter and receiving responses in the at least one receiver in response to the generation.

At 720, received responses are operated on using a fine model and coarse model by employing an optimization procedure in which a surrogate model is iteratively updated, the surrogate model generated at least initially from the coarse model. The responses received in the at least one receiver in response to the generation set of probe signals can be operated on via a processor. The surrogate model can be iteratively updated based on one or more properties of the plurality of concentric pipes, or one or more properties of the transmitters or receivers, or a surrogate model response, or a combination thereof. The optimization procedure can be based on a space mapping. The one or more properties of the transmitters or receivers can be obtained through mapping. The surrogate model response can be obtained through mapping.

At 730, use mapping coefficients of the updated surrogate model at completion of the iterations to generate final estimates of one or more properties of the plurality of concentric pipes. One or more processors can be arranged to use the mapping coefficients of the updated surrogate model to generate final estimates of one or more properties of the plurality of concentric pipes. The generated final estimates of the one or more properties can be, but are not limited to, pipe thicknesses of the plurality of concentric pipes. The final estimates of one or more properties of the plurality of concentric pipes can be used to direct and/or control operations to address issues associated with the plurality of concentric pipes.

Method 700 or methods similar to method 700 can include, via one or more processors prior to operating on the received responses to generate the thicknesses: determining a nominal pipe thickness of each pipe of the plurality of concentric pipes at a non-defect section of the respective pipe at the multiple depths; determining sections of each pipe having defects and sections of each pipe without defects; processing, using the processor, a fine model or both fine and coarse models employing a second space mapping optimization procedure to solve magnetic permeability and/or conductivity in the sections of each pipe without defects; solving for mapping coefficients in the sections of each pipe without defects or in other sections of each pipe without defects using the magnetic permeability and/or conductivity; and solving for the pipe thickness of each pipe in the sections of each pipe having defects using the mapping coefficients.

Such methods can include solving for the mapping coefficients and pipe thickness of each pipe simultaneously in the sections of each pipe having defects using the magnetic permeability and/or conductivity. Such methods can include, in the space mapping optimization, using a filter to match fine and surrogate model responses and optimizing for filter coefficients of the filter to match fine and surrogate model responses in the sections of each pipe without defects or in the other sections of each pipe without defects using the mapping coefficients to solve for the pipe thicknesses. The filter can be a deconvolution filter.

Method 700 or methods similar to method 700 can include imaging the plurality of concentric pipes on a display showing defects as defined by the thicknesses.

Figure 8:
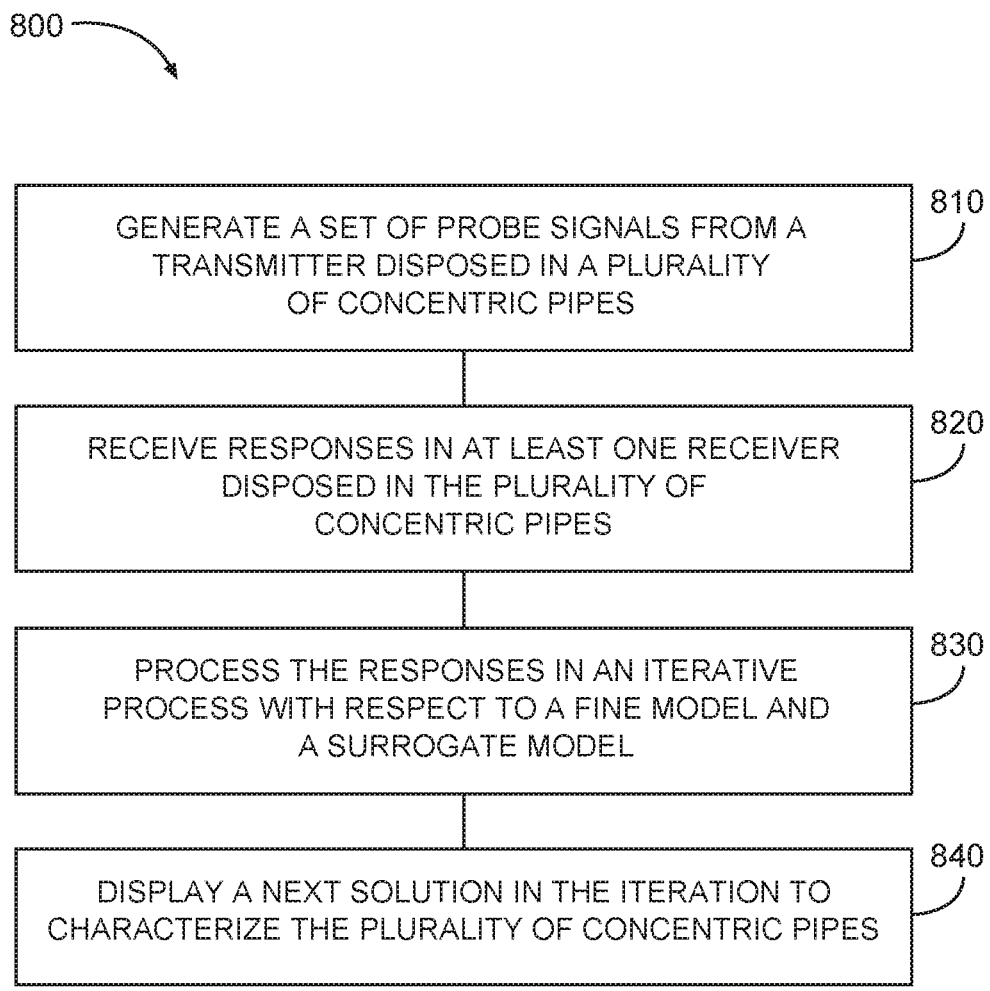
FIG. 8 is a flow diagram of features of an example method of characterizing multiple concentric pipes, in accordance with various embodiments.

FIG. 8 is a flow diagram of features of an embodiment of an example method 800 of characterizing multiple concentric pipes. At 810, a set of probe signals is generated from a transmitter disposed in a plurality of concentric pipes. At 820, responses in at least one receiver disposed in the plurality of concentric pipes are received.

At 830, the responses are processed in an iterative process with respect to a fine model and a surrogate model. The responses can be processed via one or more processors in the iterative process until a termination condition is attained. Each iteration can include: generating parameters from executing a matching condition between fine model responses for solutions of one or more properties of the plurality of concentric pipes and previous surrogate model responses for the solutions, the solutions being from at least one iteration immediately before the respective current iteration, an initial solution provided for the first iteration; constructing a surrogate model response from generating the parameters; generating a next solution from constructing an objective function as a difference between a vector of the received responses and the surrogate model response; and evaluating the fine model response at the next solution. The parameters can be mapping parameters. At 840, a next solution in the iteration to characterize the plurality of concentric pipes is displayed.

Method 800 or methods similar to method 800 can include the fine model responses being generated from a numerical forward model and a coarse model response being generated from an analytical forward model. The numerical forward model can be based on a finite element method or a finite difference time domain method.

Method 800 or methods similar to method 800 can include generating the next solution from constructing the objective function as a difference between the vector of the received responses and the surrogate model response to include providing preassigned parameters, the preassigned parameters including one or more of relative, permittivity of core material of the transmitter and/or the at least one receiver, current in the transmitter, and electrical properties of the plurality of concentric pipes.

Method 800 or methods similar to method 800 can include the solutions of the one or more properties of the plurality of concentric pipes being values of the thicknesses of the plurality of concentric pipes. The values of the thicknesses of the plurality of concentric pipes can be over an axial length of the plurality of concentric pipes. Such methods can include generating images of variation of defects from the values of the thicknesses of the plurality of concentric pipes over the axial length.

In various embodiments, a non-transitory machine-readable storage device can comprise instructions stored thereon, which, when performed by a machine, cause the machine to perform operations, the operations comprising one or more features similar to or identical to features of methods and techniques described with respect to method 700 and/or 800, variations thereof, and/or features of other methods taught herein. The physical structures of such instructions may be operated on by one or more processors. Executing these physical structures can cause the machine to perform operations comprising: making a series of measurements at multiple depths in a plurality of concentric pipes by generating a set of probe signals from a transmitter and receiving responses in at least one receiver in response to the generation, the transmitter and the at least one receiver disposed in the plurality of concentric pipes; operating on the received responses using a fine model and coarse model by employing an optimization procedure in which a surrogate model is iteratively updated based on one or more properties of the plurality of concentric pipes, or one or more properties of the transmitters or receivers, or a surrogate model response, or a combination thereof, the surrogate model generated at least initially from the coarse model; and using mapping coefficients of the updated surrogate model at completion of the iterations to generate final estimates of the one or more properties of the plurality of concentric pipes. The optimization procedure can be based on a space mapping. The one or more properties of the transmitters or receivers can be obtained through mapping. The surrogate model response can be obtained through mapping. The instructions can include instructions to operate a tool or tools having sensors, such as the transmitter and the at least one receiver, disposed in a multi-pipe structure of concentric pipes downhole in a borehole to provide data to process in accordance with the teachings herein. The multi-pipe structure may be realized as a multi-casing structure disposed in a borehole at a well site.

Such machine-readable storage devices can include instructions to include the generated final estimates of the one or more properties being pipe thicknesses of the plurality of concentric pipes. Such instructions can include, prior to operating on the received responses to generate the thicknesses: determining a nominal pipe thickness of each pipe of the plurality of concentric pipes at a non-defect section of the respective pipe at the multiple depths; determining sections of each pipe having defects and sections of each pipe without defects; processing, using the processor, a fine model or both fine and coarse models employing a second space mapping optimization procedure to solve magnetic permeability and/or conductivity in the sections of each pipe without defects; solving for mapping coefficients in the sections of each pipe without defects or in other sections of each pipe without defects using the magnetic permeability and/or conductivity; and solving for the pipe thickness of each pipe in the sections of each pipe having defects using the mapping coefficients. Such instructions can include solving for the mapping coefficients and pipe thickness of each pipe simultaneously in the sections of each pipe having defects using the magnetic permeability and/or conductivity.

Such instructions can include, in the space mapping optimization, using a filter to match fine and surrogate model responses and optimizing for filter coefficients of the filter to match fine and surrogate model responses in the sections of each pipe without defects or in the other sections of each pipe without defects using the mapping coefficients to solve for the pipe thicknesses. The filter can be a deconvolution filter. Such machine-readable storage devices can include instructions to include imaging the plurality of concentric pipes on a display showing defects as defined by the thicknesses.

Executing physical structures of instructions stored on a non-transitory machine-readable storage device, by one or more processors, can cause a machine to perform operations comprising: generating a set of probe signals from a transmitter disposed in a plurality of concentric pipes; receiving responses in at least one receiver disposed in the plurality of concentric pipes; processing, via a processor, the responses in an iterative process in which each iteration includes, until a termination condition is attained: generating parameters from executing a matching condition between fine model responses for solutions of one or more properties of the plurality of concentric pipes and previous surrogate model responses for the solutions, the solutions being from at least one iteration immediately before the respective current iteration, an initial solution provided for the first iteration; constructing a surrogate model response from generating the parameters; generating a next solution from constructing an objective function as a difference between a vector of the received responses and the surrogate model response; and evaluating the fine model response at the next solution; and displaying the next solution to characterize the plurality of concentric pipes. The parameters can be mapping parameters. The instructions can include instructions to operate a tool or tools having sensors, such as the transmitter and the at least one receiver, disposed in a multi-pipe structure of concentric pipes downhole in a borehole to provide data to process in accordance with the teachings herein. The multi-pipe structure may be realized as a multi-casing structure disposed in a borehole at a well site.

Such machine-readable storage devices can include instructions to include the fine model responses being generated from a numerical forward model and a coarse model response being generated from an analytical forward model. The numerical forward model can be based on a finite element method or a finite difference time domain method.

Such machine-readable storage devices can include generating the next solution from constructing the objective function as a difference between the vector of the received responses and the surrogate model response to include providing preassigned parameters, the preassigned parameters including one or more of relative permittivity of core material of the transmitter and/or the at least one receiver, current in the transmitter, and electrical properties of the plurality of concentric pipes.

Such machine-readable storage devices can include solutions of the one or more properties of the plurality of concentric pipes being values of the thicknesses of the plurality of concentric pipes. The values of the thicknesses of the plurality of concentric pipes can be over an axial length of the plurality of concentric pipes. Such machine-readable storage devices can include generating images of variation of defects from the values of the thicknesses of the plurality of concentric pipes over the axial length.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory module 935 of FIG. 9. While memory module 935 is shown as a single unit, terms such as "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory module," "machine-readable medium," "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Figure 9:
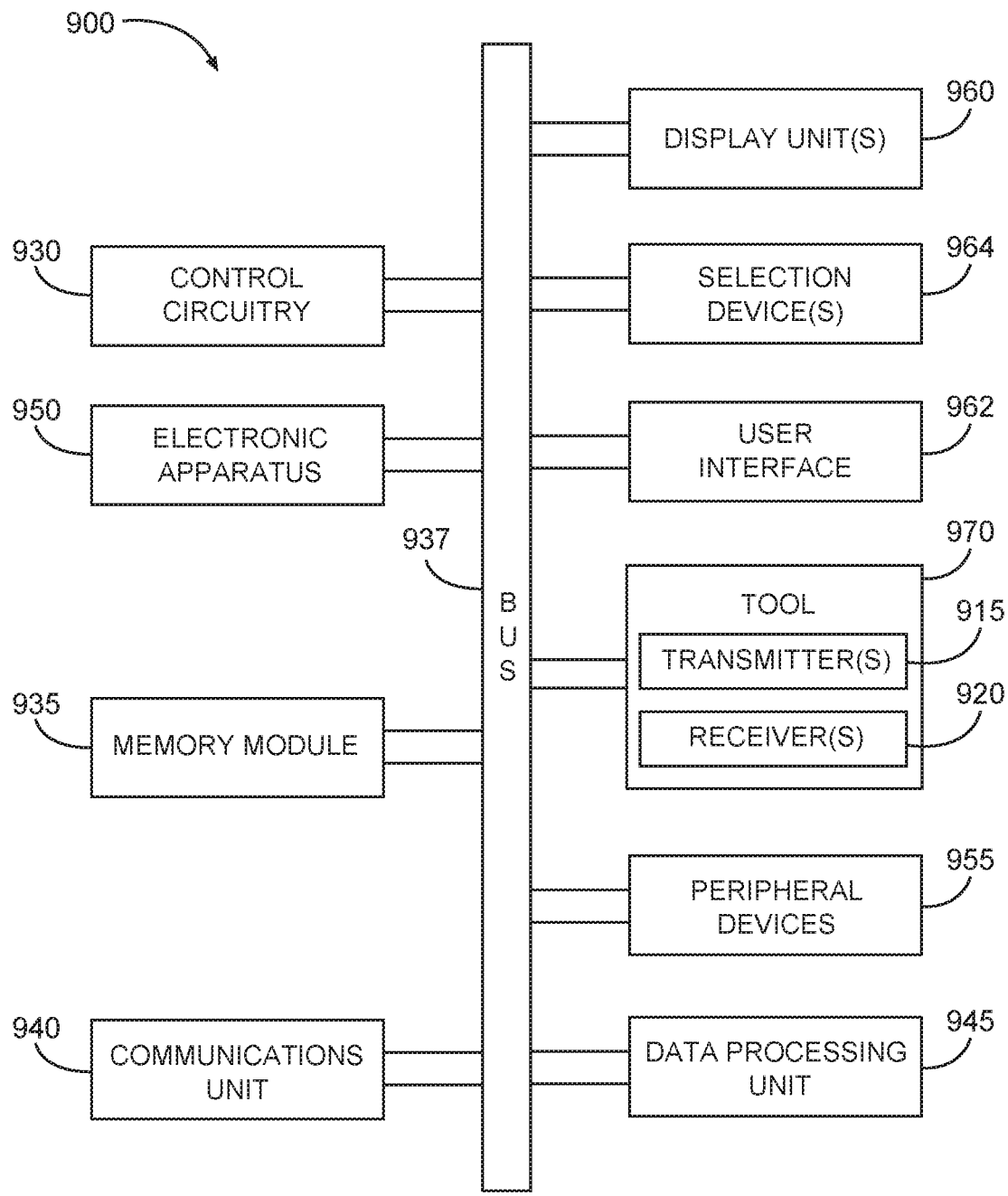
FIG. 9 is a block diagram of features of an example system operable to execute schemes associated with inspecting multiple-pipe structures, in accordance with various embodiments.

FIG. 9 is a block diagram of features of an embodiment of an example system 900 operable to execute schemes associated with inspecting multiple-pipe structures. The system 900 can be implemented at a well site to, among other things, determine characterization of multiple concentric pipes disposed in a borehole. The multi-pipe structure may be a production structure of the well site.

The system 900 can comprise a tool 970 having a set of transmitters 915, a set of receivers 920, and control circuitry 930. The set of transmitters 915 can include one or more transmitters to transmit one or more electromagnetic signals in a pipe structure having a plurality of concentric pipes, where the tool 970 is arrangeable within the pipes. The set of receivers 920 can include one or more receivers and can he arranged in the tool 970 to receive responses in response to exciting the pipe structure with the one or more electromagnetic signals. The control circuitry 930 can be arranged to control the set of transmitters 915 and the set of receivers 920. The control circuitry 930 can include one or more processors arranged to generate one or more properties of the plurality of concentric pipes using an optimization procedure based on the received responses, as taught herein. The optimization procedure can be a space mapping procedure. System 900 can be implemented to operate in a manner as taught herein to characterize a structure of multiple concentric pipes such as but not limited to the teachings associated with FIGS. 1-8.

The control circuitry 930 can be structured to operate on the received responses by use of a fine model and coarse model employing a space mapping optimization procedure in which a surrogate model is iteratively updated based on a mapping of one or more properties of the plurality of concentric pipes, or a mapping of one or more properties of the transmitters or receivers, or a mapping of surrogate model response, or a combination thereof, the surrogate model generated at least initially from the coarse model; and use mapping coefficients of the updated surrogate model at completion of the iterations to generate final estimates of the one or more properties of the plurality of concentric pipes. The generated final estimates of the one or more properties can include pipe thicknesses of the plurality of concentric pipes.

The control circuitry 930 can be arranged to, prior to operating on the received responses to generate the thicknesses: determine a nominal pipe thickness of each pipe of the plurality of concentric pipes at a non-defect section of the respective pipe at the multiple depths; determine sections of each pipe having defects and sections of each pipe without defects; process a fine model or both fine and coarse models employing a second space mapping optimization procedure to solve magnetic permeability and/or conductivity in the sections of each pipe without defects; solve for mapping coefficients in the sections of each pipe without defects or in other sections of each pipe without defects using the magnetic permeability and/or conductivity; and solve for the pipe thickness of each pipe in the sections of each pipe having defects using the mapping coefficients. The control circuitry 930 can be arranged to, prior to operating on the received responses to generate the thicknesses, solve for the mapping coefficients and pipe thickness of each pipe simultaneously in the sections of each pipe having defects using the magnetic permeability and/or conductivity.

The control circuitry 930 can be structured to implement a filter to match fine and surrogate model responses and optimizing for filter coefficients of the filter to match fine and surrogate model responses in the sections of each pipe without defects or in the other sections of each pipe without defects using the mapping coefficients to solve for the pipe thicknesses. The filter can be a deconvolution filter.

The control circuitry 930 can be arranged to process the received responses in an iterative process in which each iteration includes, until a termination condition is attained: generation of mapping parameters from execution of a matching condition between fine model responses for solutions of one or more properties of the plurality of concentric pipes and previous surrogate model responses for the solutions, the solutions being from at least one iteration immediately before the respective current iteration, an initial solution provided for the first iteration; construction of a surrogate model response from generating the mapping parameters; generation of a next solution from the construction of the objective function as a difference between a vector of the received responses and the surrogate model response; and evaluation of the fine model response at the next solution; and the control circuitry 930 is arranged to display the next solution to characterize the plurality of concentric pipes.

The control circuitry 930 can be arranged such that the fine model responses can be generated from a numerical forward model based on a finite element method or a finite difference time domain method, and a coarse model response can be generated from an analytical forward model.

The control circuitry 930 can be arranged such that generation of the next solution from the construction of the objective function as a difference between the vector of the received responses and the surrogate model responses can include provision of preassigned parameters, the preassigned parameters including one or more of relative permittivity of core material of the transmitter and/or the at least one receiver, current in the transmitter, and electrical properties of the plurality of concentric pipes.

The control circuitry 930 can be arranged such that solutions of the one or more properties of the plurality of concentric pipes are values of the thicknesses of the plurality of concentric pipes over an axial length of the plurality of concentric pipes. The control circuitry 930 can be arranged to control generation of images of variation of defects from the values of the thicknesses of the plurality of concentric pipes over the axial length.

In controlling operation of the components of system 900 to execute schemes associated with characterization of a multi-pipe structure, the control circuitry 930 can direct access of data to and from a database. The database can include parameters and/or expected parameters for the pipes being investigated such as, but not limited to, diameter (d), magnetic permeability ($\mu$), and electrical conductivity ($\sigma$).

The system 900 can include a user interface 962 operable with the control circuitry 930, a data processing unit 945 operable with the user interface 962, where the control circuitry 930, the user interface 962, and the data processing unit 945 can be structured to be operated according to any scheme similar to or identical to the schemes associated with characterization of multiple pipes as taught herein. The system 900 can be structured to operate to conduct any one of the techniques taught herein, wherein the operations can include operations to use the determined characterization to include modification of a forward model or a library. The system 900 can be arranged to perform various operations on the data, acquired from the tool 970 operational in a multi-pipe structure, in a manner similar or identical to any of the processing techniques discussed herein.

The system 900 can be arranged as a distributed system. Data from operating the tool 970 at various depths in the multi-pipe structure can be processed by the control circuitry 930. Alternatively, processing may be conducted by the data processing unit 945 as a dedicated module.

The system 900 can include a memory module 935, an electronic apparatus 950, and a communications unit 940. The control circuitry 930, the memory module 935, and the communications unit 940 can be arranged to operate as a processing unit to control management of tool 970 and to perform operations on data signals collected by the tool 970. The memory module 935 can include a database having information and other data such that the system 900 can operate on data from the tool 970. In an embodiment, the data processing unit 945 can be distributed among the components of the system 900 including memory module 935 and/or the electronic apparatus 950.

The communications unit 940 can include downhole communications for communication to the surface at a well site from the tool 970 in a multi-pipe structure. The communications unit 940 may use combinations of wired communication technologies and wireless technologies at frequencies that do not interfere with on-going measurements. The communications unit 940 can allow for a portion or all of the data analysis to be conducted within a multi-pipe structure with results provided to the user interface 962 for presentation on one or more display unit(s) 960 aboveground. The communications unit 940 can provide for data to be sent aboveground such that substantially all analysis is performed aboveground. The data collected by the tool 970 can be stored with the tool 970 that can be brought to the surface to provide the data to the one or more processors 930, the user interface 962, and the data processing unit 945. The communications unit 940 can allow for transmission of commands to tool 970 in response to signals provided by a user through the user interface 962.

The system 900 can also include a bus 937, where the bus 937 provides electrical conductivity among the components of the system 900. The bus 937 can include an address bus, a data bus, and a control bus, each independently configured. The bus 937 can be realized using a number of different communication mediums that allows for the distribution of components of the system 900. Use of the bus 937 can be regulated by the control circuitry 930. The bus 937 can include a communications network to transmit and receive signals including data signals and command and control signals.

In various embodiments, peripheral devices 955 can include drivers to provide voltage and/or current input to the set of transmitters 915, additional storage memory and/or other control devices that may operate in conjunction with the control circuitry 930 and/or the memory module 935. The display unit(s) 960 can be arranged with a screen display, as a distributed component on the surface, which can be used with instructions stored in the memory module 935 to implement the user interface 962 to manage the operation of the tool 970 and/or components distributed within the system 900. Such a user interface can be operated in conjunction with the communications unit 940 and the bus 937. The display unit(s) 960 can include a video screen, a printing device, or other structure to visually project data/information and images. The system 900 can include a number of selection devices 964 operable with the user interface 962 to provide user inputs to operate the data processing unit 945 or its equivalent. The selection device(s) 964 can include one or more of a touch screen or a computer mouse operable with the user interface 962 to provide user inputs to operate the data processing unit 945 or other components of the system 900.

Analysis of the casing condition is an important objective, as tubing/casing removal is both expensive and time consuming, particularly in offshore platforms. In conventional corrosion evaluation tools, the inversion algorithms are developed based on the comparison of the measured responses with the responses in a library or responses obtained from a forward model. Constructing a complete library is very difficult while using forward models may be very time-consuming (if using numerical models) or not accurate enough (if using analytical models). In various embodiments, an inversion algorithm based on the space mapping optimization technology can be implemented to provide fast and accurate solutions when inspecting multiple pipes. Using more accurate and faster inversion technologies leads to better interpretation of the integrity of the casings which in turn leads to significant financial advantages during the production process.

A method 1 can comprise: making a series of measurements at multiple depths in a plurality of concentric pipes by generating a set of probe signals from a transmitter and receiving responses in at least one receiver in response to the generation, the transmitter and the at least one receiver disposed in the plurality of concentric pipes; operating on the received responses, via a processor, using a fine model and coarse model by employing an optimization procedure in which a surrogate model is iteratively updated based on one or more properties of the plurality of concentric pipes, or one or more properties of the transmitters or receivers, or a surrogate model response, or a combination thereof, the surrogate model generated at least initially from the coarse model; and using, via the processor, coefficients of the updated surrogate model at completion of the iterations to generate final estimates of the one or more properties of the plurality of concentric pipes.

A method 2 can include elements of method 1 and can include the optimization procedure being based on a space mapping.

A method 3 can include elements of any of methods 1 or 2 and can include the one or more properties of the transmitters or receivers being obtained through mapping.

A method 4 can include elements of any of methods 1-3 and can include the surrogate model response being obtained through mapping.

A method 5 can include elements of any of methods 1-4 and can include the generated final estimates of the one or more properties being pipe thicknesses of the plurality of concentric pipes.

A method 6 can include elements of method 5 and elements of any of methods 1-4 and can include, via the processor prior to operating on the received responses to generate thicknesses of the plurality of concentric pipes: determining a nominal pipe thickness of each pipe of the plurality of concentric pipes at a non-defect section of the respective pipe at the multiple depths; determining sections of each pipe having defects and sections of each pipe without defects; processing, using the processor, a fine model or both fine and coarse models employing a second space mapping optimization procedure to solve magnetic permeability and/or conductivity in the sections of each pipe without defects; solving for mapping coefficients in the sections of each pipe without defects or in other sections of each pipe without defects using the magnetic permeability and/or conductivity; and solving for the pipe thickness of each pipe in the sections of each pipe having defects using the mapping coefficients.

A method 7 can include elements of method 6 and elements of any of methods 1-5 and can include solving for the mapping coefficients and pipe thickness of each pipe simultaneously in the sections of each pipe having defects using the magnetic permeability and/or conductivity.

A method 8 can include elements of method 6 and elements of any of methods 1-5 and 7 and can include, in the space mapping optimization, using a filter to match fine and surrogate model responses and optimizing for filter coefficients of the filter to match fine and surrogate model responses in the sections of each pipe without defects or in the other sections of each pipe without defects using the mapping coefficients to solve for the pipe thicknesses.

A method 9 can include elements of method 8 and any of methods 1-7 and can include the filter being a deconvolution filter.

A method 10 can include elements of claim 8 and elements of any of methods 1-7 and 9 and can include imaging the plurality of concentric pipes on a display showing defects as defined by the thicknesses.

A method 11 can comprise: generating a set of probe signals from a transmitter disposed in a plurality of concentric pipes; receiving responses in at least one receiver disposed in the plurality of concentric pipes; processing, via a processor, the responses in an iterative process in which each iteration includes, until a termination condition is attained: generating parameters from executing a matching condition between fine model responses for solutions of one or more properties of the plurality of concentric pipes and previous surrogate model responses for the solutions, the solutions being from at least one iteration immediately before the respective current iteration, an initial solution provided for the first iteration; constructing a surrogate model response from generating the parameters; generating a next solution from constructing an objective function as a difference between a vector of the received responses and the surrogate model response; and evaluating the fine model response at the next solution; and displaying the next solution to characterize the plurality of concentric pipes.

A method 12 can include elements of method 11 and can include the parameters being mapping parameters.

A method 13 can include elements of any of methods 11 and 12 and can include the fine model responses being generated from a numerical forward model and a coarse model response being generated from an analytical forward model.

A method 14 can include elements of method 13 and elements of claims 11-12 and can include the numerical forward model being based on a finite element method or a finite difference time domain method.

A method 15 can include elements of any of methods 11-14 and can include generating the next solution from constructing the objective function as a difference between the vector of the received responses and the surrogate model response to include providing preassigned parameters, the preassigned parameters including one or more of relative permittivity of core material of the transmitter and/or the at least one receiver, current in the transmitter, and electrical properties of the plurality of concentric pipes.

A method 16 can include elements of any of methods 11-15 and can include solutions of the one or more properties of the plurality of concentric pipes being values of the thicknesses of the plurality of concentric pipes.

A method 17 can include elements of method 16 and elements of any of methods 11-15 and can include the values of the thicknesses of the plurality of concentric pipes being over an axial length of the plurality of concentric pipes.

A method 18 can include elements of method 17 and elements of any of methods 11-16 and can include generating images of variation of defects from the values of the thicknesses of the plurality of concentric pipes over the axial length.

A machine-readable storage device 1 having instructions stored thereon, which, when performed by a machine, cause the machine to perform operations, the operations comprising: making a series of measurements at multiple depths in a plurality of concentric pipes by generating a set of probe signals from a transmitter and receiving responses in at least one receiver in response to the generation, the transmitter and the at least one receiver disposed in the plurality of concentric pipes; operating on the received responses, via a processor, using a fine model and coarse model by employing an optimization procedure in which a surrogate model is iteratively updated based on one or more properties of the plurality of concentric pipes, or one or more properties of the transmitters or receivers, or a surrogate model response, or a combination thereof, the surrogate model generated at least initially from the coarse model; and using, via the processor, coefficients of the updated surrogate model at completion of the iterations to generate final estimates of the one or more properties of the plurality of concentric pipes.

A machine-readable storage device can include elements of machine-readable storage device 1 and can include the optimization procedure being based on a space mapping.

A machine-readable storage device 3 can include elements of any of machine-readable storage devices 1 or 2 and can include the one or more properties of the transmitters or receivers being obtained through mapping.

A machine-readable storage device 4 can include elements of any of machine-readable storage devices 1-3 and can include the surrogate model response being obtained through mapping.

A machine-readable storage device 5 can include elements of any machine-readable storage devices 1-4 and can include the generated final estimates of the one or more properties being pipe thicknesses of the plurality of concentric pipes.

A machine-readable storage device 6 can include elements of machine-readable storage device 5 and elements of any of machine-readable storage devices 1-4 and can include, via the processor prior to operating on the received responses to generate thicknesses of the plurality of concentric pipes: determining a nominal pipe thickness of each pipe of the plurality of concentric pipes at a non-defect section of the respective pipe at the multiple depths; determining sections of each pipe having defects and sections of each pipe without defects; processing, using the processor, a fine model or both fine and coarse models employing a second space mapping optimization procedure to solve magnetic permeability and/or conductivity in the sections of each pipe without defects; solving for mapping coefficients in the sections of each pipe without defects or in other sections of each pipe without defects using the magnetic permeability and/or conductivity; and solving for the pipe thickness of each pipe in the sections of each pipe having defects using the mapping coefficients.

A machine-readable storage device 7 can include elements of machine-readable storage device 6 and elements of any of machine-readable storage devices 1-5 and can include solving for the mapping coefficients and pipe thickness of each pipe simultaneously in the sections of each pipe having defects using the magnetic permeability and/or conductivity.

A machine-readable storage device 8 can include elements of machine-readable storage devices 6 and elements of any of machine-readable storage devices 1-5 and 7 can include solving for the mapping coefficients and pipe thickness of each pipe simultaneously in the sections of each pipe having defects using the magnetic permeability and/or conductivity.

A machine-readable storage device 9 can include elements of machine-readable storage device 8 and any of machine-readable storage devices 1-7 and can include the filter being a deconvolution filter.

A machine-readable storage device 10 can include elements of machine-readable storage device 8 and elements of any of machine-readable storage devices 1-7 and 9 and can include imaging the plurality of concentric pipes on a display showing defects as defined by the thicknesses.

A machine-readable storage device 11 can comprise: generating a set of probe signals from a transmitter disposed in a plurality of concentric pipes; receiving responses in at least one receiver disposed in the plurality of concentric pipes; processing, via a processor, the responses in an iterative process in which each iteration includes, until a termination condition is attained: generating parameters from executing a matching condition between fine model responses for solutions of one or more properties of the plurality of concentric pipes and previous surrogate model responses for the solutions, the solutions being from at least one iteration immediately before the respective current iteration, an initial solution provided for the first iteration; constructing a surrogate model response from generating the parameters; generating a next solution from constructing an objective function as a difference between a vector of the received responses and the surrogate model response; and evaluating the fine model response at the next solution; and displaying the next solution to characterize the plurality of concentric pipes.

A machine-readable storage device 12 can include elements of machine-readable storage device 11 and can include the parameters being mapping parameters.

A machine-readable storage device 13 can include elements of any of machine-readable storage devices 11 and 12 and can include the fine model responses being generated from a numerical forward model and a coarse model response being generated from an analytical forward model.

A machine-readable storage device 14 can include elements of machine-readable storage device 13 and elements of any of machine-readable storage devices 11-12 and can include the numerical forward model being based on a finite element method or a finite difference time domain method.

A machine-readable storage device 15 can include elements of any of machine-readable storage devices 11-14 and can include generating the next solution from constructing the objective function as a difference between the vector of the received responses and the surrogate model response to include providing preassigned parameters, the preassigned parameters including one or more of relative permittivity of core material of the transmitter and/or the at least one receiver, current in the transmitter, and electrical properties of the plurality of concentric pipes.

A machine-readable storage device 16 can include elements of any of machine-readable storage device 11-15 and can include solutions of the one or more properties of the plurality of concentric pipes being values of the thicknesses of the plurality of concentric pipes.

A machine-readable storage device 17 can include elements of machine-readable storage device 16 and elements of any of machine-readable storage devices 11-16 and can include the values of the thicknesses of the plurality of concentric pipes being over an axial length of the plurality of concentric pipes.

A machine-readable storage device 18 can include elements of machine-readable storage device 17 and elements of any of machine-readable storage device 11-16 and can include generating images of variation of defects from the values of the thicknesses of the plurality of concentric pipes over the axial length.

A system 1 can comprise: a tool having a set of transmitters to transmit one or more electromagnetic signals in a pipe structure having a plurality of concentric pipes, the tool being arrangeable within the pipes; a set of receivers arranged in the tool to receive responses in response to exciting the pipe structure with the one or more electromagnetic signals; and a processor arranged to generate one or more properties of the plurality of concentric pipes using an optimization procedure based on the received responses.

A system 2 can include elements of system 1 and can include the optimization procedure being a space mapping procedure.

A system 3 can include elements of any of systems 1 and 2 and can include the processor arranged to: operate on the received responses by use of a fine model and coarse model employing a space mapping optimization procedure in which a surrogate model is iteratively updated based on a mapping of one or more properties of the plurality of concentric pipes, or a mapping of one or more properties of the transmitters or receivers, or a mapping of surrogate model response, or a combination thereof, the surrogate model generated at least initially from the coarse model; and use mapping coefficients of the updated surrogate model at completion of the iterations to generate final estimates of the one or more properties of the plurality of concentric pipes.

A system 4 can include elements of system 3 and elements of any of systems 1-2 and can include the generated final estimates of the one or more properties being pipe thicknesses of the plurality of concentric pipes.

A system 5 can include elements of system 4 and elements of any of systems 1-3 and can include the processor arranged to, prior to operating on the received responses to generate the thicknesses: determine a nominal pipe thickness of each pipe of the plurality of concentric pipes at a non-defect section of the respective pipe at the multiple depths; determine sections of each pipe having defects and sections of each pipe without defects; process a fine model or both fine and coarse models employing a second space mapping optimization procedure to solve magnetic permeability and/or conductivity in the sections of each pipe without defects; solve for flapping coefficients in the sections of each pipe without defects or in other sections of each pipe without defects using the magnetic permeability and/or conductivity; and solve for the pipe thickness of each pipe in the sections of each pipe having defects using the mapping coefficients.

A system 6 can include elements of system 5 and elements of any of systems 1-4 and can include the processor arranged to, prior to operating on the received responses to generate the thicknesses, solve for the mapping coefficients and pipe thickness of each pipe simultaneously in the sections of each pipe having defects using the magnetic permeability and/or conductivity.

A system 7 can include elements of system 5 and elements of any of systems 1-4 or 6 and can include the processor arranged to implement a filter to match fine and surrogate model responses and optimizing for filter coefficients of the filter to match fine and surrogate model responses in the sections of each pipe without defects or in the other sections of each pipe without defects using the flapping coefficients to solve for the pipe thicknesses.

A system 8 can include elements any of systems 1-7 and can include the processor arranged to process the received responses in an iterative process in which each iteration includes, until a termination condition is attained: generation of mapping parameters from execution of a matching condition between fine model responses for solutions of one or more properties of the plurality of concentric pipes and previous surrogate model responses for the solutions, the solutions being from at least one iteration immediately before the respective current iteration, an initial solution provided for the first iteration; construction of a surrogate model response from generating the mapping parameters; generation of a next solution from the construction of the objective function as a difference between a vector of the received responses and the surrogate model response; and evaluation of the fine model response at the next solution; and the processor is arranged to display the next solution to characterize the plurality of concentric pipes.

A system 9 can include elements of system 8 and elements any of systems 1-7 and can include the fine model responses generated from a numerical forward model based on a finite element method or a finite difference time domain method, and a coarse model response generated from an analytical forward model.

A system 10 can include elements of system 9 and elements any of systems 1-8 and can include generation of the next solution from the construction of the objective function as a difference between the vector of the received responses and the surrogate model responses to include provision of preassigned parameters, the preassigned parameters including one or more of relative permittivity of core material of the transmitter and/or the at least one receiver, current in the transmitter, and electrical properties of the plurality of concentric pipes.

A system 11 can include elements of system 8 and elements any of systems 1-7 and 9-10 and can include solutions of the one or more properties of the plurality of concentric pipes being values of the thicknesses of the plurality of concentric pipes over an axial length of the plurality of concentric pipes.

A system 12 can include elements of system 11 and elements any of systems 1-10 and can include the processor arranged to control generation of images of variation of defects from the values of the thicknesses of the plurality of concentric pipes over the axial length.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. One or more non-transitory machine-readable media comprising program code, the program code to:
   receive responses comprising a series of measurements at multiple depths in a plurality of concentric pipes by generating a set of probe signals from a transmitter, the transmitter and at least one receiver disposed in the plurality of concentric pipes;
   determine pipe thickness for each of the concentric pipes at the multiple depths based on the series of measurements;
   determine defective sections and defect-free sections of each of the concentric pipes based on the series of measurements;
   process a space mapping optimization procedure including a fine model and a coarse model to solve magnetic permeability and/or conductivity in the defect-free sections;
   compute mapping coefficients in the defect-free sections using the magnetic permeability and/or conductivity;
   compute, using the mapping coefficients associated with the defect-free sections, a thickness for each of the defective sections; and
   compute simultaneously mapping coefficients and thickness of each defective section using the magnetic permeability and/or conductivity.

2. The one or more non-transitory machine-readable media of claim 1, where the space mapping optimization procedure includes a surrogate model that is iteratively updated based on one or more properties of the concentric pipes.

3. The one or more non-transitory machine-readable media of claim 1, wherein the program code includes program code to,
   in the space mapping optimization procedure, use a filter to match fine and surrogate model responses and optimize for filter coefficients of the filter to match fine and surrogate model responses in the defect-free sections or in the defective sections using the mapping coefficients to solve for a thickness of each pipe, wherein the filter is a deconvolution filter, and
   present the plurality of concentric pipes on a display device showing defects as defined by the thickness of each pipe.

4. A system comprising:
a tool having a set of transmitters to transmit one or more electromagnetic signals in a pipe structure having a plurality of concentric pipes, the tool being arrangeable within the pipe structure;
a set of receivers arranged in the tool to receive responses in response to exciting the pipe structure with the one or more electromagnetic signals, wherein the responses include a series of measurements at multiple depths in the pipe structure; and
a processor; and
one or more non-transitory machine-readable media including program code executable on the processor, the program code to:
   operate on the responses using a fine model and a coarse model by employing an optimization procedure in which a surrogate model is iteratively updated based on one or more properties of the pipe structure, the surrogate model generated at least initially from the coarse model,
   determine pipe thickness for each of the concentric pipes at the multiple depths based on the series of measurements;
   determine defective sections and defect-free sections of each of the concentric pipes based on the series of measurements;
   process a space mapping optimization procedure including a fine model and a coarse model to solve magnetic permeability and/or conductivity in the defect-free sections;
      compute mapping coefficients in the defect-free sections using the magnetic permeability and/or conductivity;
      compute, using the mapping coefficients of the defect-free sections, a thickness for each of the defective sections; and
      compute simultaneously mapping coefficients and thickness of each defective section using the magnetic permeability and/or conductivity.

5. The system of claim 4, wherein the processor is arranged to:
operate on the received responses by use of a fine model and coarse model employing a space mapping optimization procedure in which a surrogate model is iteratively updated based on a mapping of one or more properties of the plurality of concentric pipes, or a mapping of one or more properties of the transmitters or receivers, or a mapping of surrogate model response, or a combination thereof, the surrogate model generated at least initially from the coarse model; and
use mapping coefficients of the updated surrogate model at completion of iterations to generate final estimates of the one or more properties of the plurality of concentric pipes.

6. The system of claim 5, wherein the generated final estimates of the one or more properties are pipe thicknesses of the plurality of concentric pipes.

7. The system of claim 4, wherein the processor is arranged to implement a filter to match fine and surrogate model responses and optimizing for filter coefficients of the filter to match fine and surrogate model responses in the defect-free sections or in the defective sections using the mapping coefficients to solve for the pipe thicknesses.

8. The system of claim 4, wherein the processor is further configured to:
generate mapping parameters from execution of a matching condition between fine model responses for solutions of one or more properties of the plurality of concentric pipes and previous surrogate model responses for the solutions, the solutions being from at least one iteration immediately before a respective current iteration, an initial solution provided for a first iteration;
construction of a surrogate model response from generating the mapping parameters;
generation of a next solution from the construction of an objective function as a difference between a vector of the received responses and the surrogate model response; and
evaluation of the fine model response at the next solution; and
the processor is arranged to display the next solution to characterize the plurality of concentric pipes.

9. The system of claim 8,
wherein the system includes the fine model responses generated from a numerical forward model based on a finite element method or a finite difference time domain method, and a coarse model response generated from an analytical forward model,
wherein generation of the next solution from the construction of the objective function as a difference between the vector of the received responses and surrogate model responses includes provision of preassigned parameters, the preassigned parameters including one or more of relative permittivity of core material of the set of transmitters and/or the set of receivers, current in the transmitter, and electrical properties of the plurality of concentric pipes,
wherein solutions of the one or more properties of the plurality of concentric pipes are values of the thicknesses of the plurality of concentric pipes over an axial length of the plurality of concentric pipes, and
wherein the processor is arranged to control generation of images of variation of defects from the values of the thicknesses of the plurality of concentric pipes over the axial length.

10. The system of claim 8,
wherein solutions of the one or more properties of the plurality of concentric pipes are values of the thicknesses of the plurality of concentric pipes over an axial length of the plurality of concentric pipes, and
wherein the processor is arranged to control generation of images of variation of defects from the values of the thicknesses of the plurality of concentric pipes over the axial length.

11. A method comprising:
receiving responses comprising a series of measurements at multiple depths in a plurality of concentric pipes by generating a set of probe signals from a transmitter, the transmitter and at least one receiver disposed in the plurality of concentric pipes;
determining pipe thickness for each of the concentric pipes at the multiple depths based on the series of measurements;
determining defective sections and defect-free sections of each of the concentric pipes based on the series of measurements;
processing a space mapping optimization procedure including a fine model and a coarse model to solve magnetic permeability and/or conductivity in the defect-free sections of each of the concentric pipes;
computing mapping coefficients in the defect-free sections of each of the concentric pipes using the magnetic permeability and/or conductivity;

computing, using the mapping coefficients of the defect-free sections, a thickness for each of the defective sections; and computing simultaneously mapping coefficients and thickness of each defective section using the magnetic permeability and/or conductivity.

12. The method of claim 11, wherein the space mapping optimization procedure includes a surrogate model that is iteratively updated based on one or more properties of the concentric pipes.

13. The method of claim 12 further including:

in the space mapping optimization procedure, use a filter to match fine and surrogate model responses and optimize for filter coefficients of the filter to match fine and surrogate model responses in the defect-free sections or in the defective sections using the mapping coefficients to solve for the thickness of each pipe, wherein the filter is a deconvolution filter, and present the plurality of concentric pipes on a display device showing defects as defined by the thickness of each of the concentric pipes.

\* \* \* \* \*